United States Patent [19]

Murakami et al.

[11] Patent Number: 5,446,517
[45] Date of Patent: Aug. 29, 1995

[54] CAMERA

[75] Inventors: Junichi Murakami; Naoya Kaneda, both of Kanagawa, Japan

[73] Assignee: Canon Kabushiki Kaisha, Tokyo, Japan

[21] Appl. No.: 282,226

[22] Filed: Jul. 29, 1994

Related U.S. Application Data

[63] Continuation of Ser. No. 34,625, Mar. 22, 1993, abandoned, which is a continuation of Ser. No. 694,673, May 2, 1991, abandoned.

[30] Foreign Application Priority Data

May 14, 1990 [JP] Japan ................................. 2-123707

[51] Int. Cl.$^6$ .............................................. G03B 13/36
[52] U.S. Cl. .................................... 354/400; 318/696
[58] Field of Search ............... 354/400, 195.1, 195.12, 354/195.13, 412, 484, 439, 452, 418; 318/696; 359/696

[56] References Cited

U.S. PATENT DOCUMENTS

| | | | |
|---|---|---|---|
| 4,564,796 | 1/1986 | Yoshino et al. | 318/696 |
| 4,751,445 | 6/1988 | Sakai | 354/452 |
| 4,812,727 | 3/1989 | Sakai et al. | 318/696 |
| 4,851,869 | 7/1989 | Ishimaru et al. | 354/195.1 |
| 4,976,523 | 12/1990 | Ishikawa | 359/684 |
| 4,989,029 | 1/1991 | Inoue et al. | 354/418 |
| 5,016,993 | 5/1991 | Akitake | 354/195.13 |
| 5,027,150 | 6/1991 | Inoue et al. | 354/484 |
| 5,059,883 | 10/1991 | Takahashi | 318/696 |
| 5,060,005 | 10/1991 | Itoh et al. | 354/412 |
| 5,066,968 | 11/1991 | Suzuki et al. | 354/400 |
| 5,212,516 | 5/1993 | Yamada et al. | 354/402 |
| 5,252,903 | 10/1993 | Maruyama | 318/696 |

*Primary Examiner*—Russell E. Adams
*Attorney, Agent, or Firm*—Robin, Blecker, Daley & Driscoll

[57] ABSTRACT

An optical apparatus having a lens driving device includes a stepping motor for driving a lens which is movable along an optical axis and a controller for driving the stepping motor. The controller selectively changes excitation for the stepping motor among a plurality of respectively different excitations.

5 Claims, 9 Drawing Sheets

CAMERA

This is a continuation application under 37 CFR 1.62 of prior application Ser. No. 08/034,625, filed Mar. 22, 1993, (abandoned) which is a cont. of Ser. No. 07/694,673, filed May 2, 1991, (abandoned).

BACKGROUND OF THE INVENTION

1. Field of the Invention

This invention relates to an optical apparatus having a lens driving device.

2. Description of the Related Art

The camera apparatuses of the kind continuously taking a motion picture such as video cameras or the like have been arranged to drive or stop a focusing lens group or to determine the lens driving direction according to the result of determination of a near, far or in-focus state detected by an automatic focusing (hereinafter referred to as AF) device. In some cases, the speed of driving the lens group is arranged to be variable according to the degree of blur resulting from a defocus state.

FIG. 8 shows by way of example an apparatus comprising in combination an automatic focusing device which is of the kind determining an in-focus state when a high-frequency component of a luminance signal coming from an image sensor 101 reaches its peak and a so-called rear focus zoom lens in which a group of lenses other than a first lens group forms a focusing lens group. In the case of FIG. 8, first and second lens groups 102 and 103 are arranged to be movable in association with each other by a power varying action. A zooming action is performed by moving the first and second lens groups in a predetermined relation. The shortest focal length is obtained when the total lens length becomes a minimum length. The illustration includes an iris 104; a stationary lens group 105; and a movable lens group 106 which has a focusing function and a compensating function which is performed during the process of zooming.

This movable lens group 106 must be arranged to vary its locus according to a distance to a picture-taking object. If the zoom lens system is fixed to a single focal length, a focusing action is performed by drawing out or in the lens group 106. The lens system is focused on an object located at the nearest distance with the lens group 106 drawn out. The illustration further includes a CPU 107; boundary data 108 provided for defining areas which will be described later; and speed data 109 and rotating direction data 110 stored for the speed and direction of each of the areas determined by the position of the lens group 106 which can be found from the result of detection made by a zoom encoder reading circuit 111 and the output of a stepping motor driving pulse output circuit 112.

A reference numeral 113 denotes a zoom operation switch. A numeral 114 denotes a main (or power supply) switch. A power-on reset circuit 115 is arranged to reset a step pulse count to zero by setting a stepping motor 117 in a predetermined position when the power is turned on. A stepping motor driver 116 is arranged to drive the stepping motor 117 in response to a driving instruction given by the CPU 107. A zoom motor driver 118 is arranged to drive a zoom motor 119 in response to a driving instruction given by the CPU 107. A modulation actuator driver 123 drives a modulation actuator 120 which is arranged to change the position of an image sensor 101 such as a CCD or the like in the direction of focusing, i.e., in the direction of an optical axis. A piezoelectric actuator, a voice coil or the like can be employed as the modulation actuator 120. Further, an action equivalent to the action of the modulation actuator 120 can be accomplished by amplitude-modulating the lens group 106 in the optical axis direction with the stepping motor 117. An F value reading circuit 121 (an aperture encoder circuit) is arranged to read an aperture value through the output of a detecting element such as a Hall element or the like disposed in a driving meter of the iris 104.

At the AF device 122, the amplitude of the modulation actuator 120 or the stepping motor 117 is determined on the basis of information on the aperture value, because the depth of field varies with the aperture value to vary a relation between the change of the degree of focus and the displacement of the image sensor 101.

The AF device 122 is described with reference to FIG. 9 as follows: The image sensor 101 which is a CCD or the like is arranged to produce an image signal. This signal is amplified by a preamplifier 151. After that, a high-frequency component of the amplified image signal is taken out by means of a high-pass filter (HPF) 152. From the image signal thus output from the high-pass filter 152, a signal which corresponds to the inside of a predetermined distance measuring field is then taken out by means of a gate circuit 153.

The signal which has passed through the gate circuit 153 is subjected to a detection process at a detection circuit 154. The output of the detection circuit 154 is integrated by an integrating circuit 155. The integrated signal is converted into a digital signal by an A/D converter circuit 156. FIG. 10 shows the value FV of the high-frequency component of this signal. As shown, the value FV is large when the image is sharp. The value FV becomes small when the image is not sharp and is blurred. The in-focus state of the lens group 106 can be determined by detecting a position of the lens group 106 where the value FV is obtained at the largest value as shown in FIG. 10. At the CPU 107, the driving direction of the motor 117 and the driving speed of the motor 117 are determined on the basis of the absolute value of the value FV, a difference between the previous and current values of the value FV, and the aperture value obtained from an aperture encoder 157, etc. Again referring to FIG. 8, the position of the lens group 106 is controlled not only according to the result of distance measurement performed by the AF device 122. During the process of zooming, in particular, the lens position is controlled by starting the stepping motor 117 simultaneously with the zoom motor 119 on the basis of the area data stored for every designated area, which is determined by the output of a zoom encoder and the number of pulses of the stepping motor 117.

FIG. 11 is a graph showing the positional relation between the variator lens group and the focusing lens group obtained at various object distances. The position of the variator lens group is shown on the abscissa axis and that of the focusing lens group on the ordinate axis. In FIG. 11, the object distances are indicated in such a way as ∞, 2 m, 0.4 m, and 0.002 m. Assuming that the moving speed of the variator lens group in zooming is unvarying, the abscissa axis can be regarded as time. Assuming that the time required for distance measurement by controlling the lens solely by means of the automatic focusing device during the process of zooming is t1, when the lens is zoomed from an in-focus state obtained at a point P1 in the direction of wide-angle (W), the lens group 106 does not move in response to zooming until the lapse of the time t1. Therefore, the positional relation between the two lens groups becomes as indicated by a point P2 to bring forth a circle of confusion as much as "d1 X (the sensitivity of the lens group 106)/F-number". If this degree of blur presents a problem, the blur can be greatly improved by simultaneously starting the zoom motor 119 and the stepping motor 117 at a speed obtained by differentiating with the point P1 an object distance locus which includes the point P1. For example, zooming in the wide-angle direction from the point P1 reaches a point P3 after the lapse of time t1. With an ideal point assumed to be a point P4, the blur occurring can be expressed as "d2 X (the sensitivity of the lens group 106)/F-number". This clearly shows the great effect of the above-stated simultaneous start.

Therefore, a map arranged within the CPU 107 is divided, as shown in FIG. 12, both in the direction of the variator lens group positions and the direction of the focusing lens group positions according to the required degree of definition. Then, a representative speed for each of the areas is stored within a memory of an electronic circuit in such a way as to minimize the degree of blur occurring in the process of zooming. During zooming, the speed data stored comes to show a maximum speed value at a point in the neighborhood of a telephoto end to cause the stepping motor 117 to be rotated at this value.

The speed and position of the stepping motor which is employed as a focusing motor are controlled in the above-stated manner. There are various exciting or current variation methods for driving a stepping motor. Each of these different methods has its own feature. The exciting methods generally employed in driving a two-phase stepping motor are shown in FIGS. 13(a) to 13(d). FIG. 13(a) shows one-phase excitation or current and FIG. 13(b) two-phase excitation or current. These methods permit driving at a higher speed than other methods. FIG. 13(c) shows one/two-phase excitation, which permits stopping position control within one half of the two-phase excitation. FIG. 13(d) shows another exciting method. In this case, a portion of the one/two-phase excitation corresponding to the two-phase excitation is divided stepwise to permit finer control. Hereinafter, this exciting method is referred to as the MS excitation.

The characteristic of the stepping motor can be expressed as shown in FIG. 14 by taking the rotating speed on the abscissa axis and the torque thereon on the of ordinate axis. In FIG. 14, a reference numeral 160 denotes a pull-in torque. The inner side of the pull-in torque 160 is called a self-start area within which the stepping motor can make a self-start. A numeral 161 denotes a pull-out torque. The area between the pull-in torque 160 and the pull-out torque 161 is called a through area. In the through area, the stepping motor is usable by gradually raising the rotating speed from the self-start area. Further, this characteristic varies when the exciting method changes even with the same motor used.

Heretofore, in cases where a stepping motor is used as a focusing motor, the motor is used within the above-stated self-start area in accordance with one of the various exciting methods mentioned.

In the case of the conventional apparatus mentioned by way of example in the foregoing, only one of the exciting methods is employed in driving the stepping motor. As a result of that, the conventional apparatus has had the following shortcomings: (I) the length of time for avoiding a blurred state becomes long when position control is finely performed in the neighborhood of an in-focus point; (II) the control becomes difficult when the stepping motor is used within the through area; (III) if position control is finely performed for AF (automatic focusing), it is difficult to drive the stepping motor at a required rotating speed in zooming; (IV) and further, in order to eliminate the above-stated shortcomings, the size of the stepping motor must be increased.

SUMMARY OF THE INVENTION

This invention is directed to the elimination of the above-stated shortcomings of the conventional apparatus. It is, therefore, a principal object of the invention to provide an optical apparatus which is arranged to have its performance improved by changing the method of exciting a stepping motor for moving a lens from one method to another according to conditions.

The above and other objects and features of the invention will become apparent from the following detailed description of embodiments thereof taken in connection with the accompanying drawings.

DETAILED DESCRIPTION OF THE PREFERRED EMBODIMENTS

Figure 8:
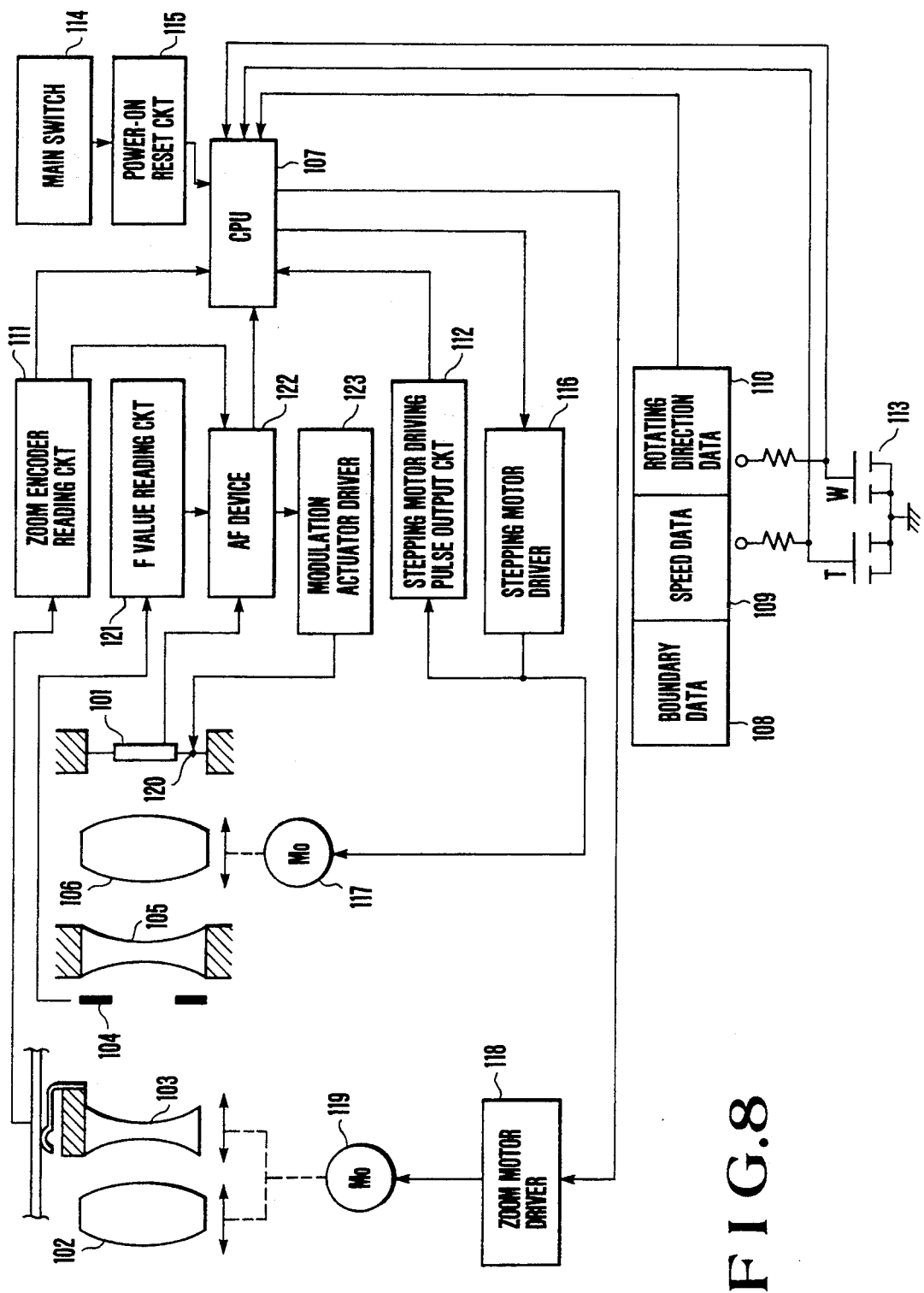
FIG. 8 is a block diagram showing in outline the arrangement of the conventional video camera.
Figure 9:
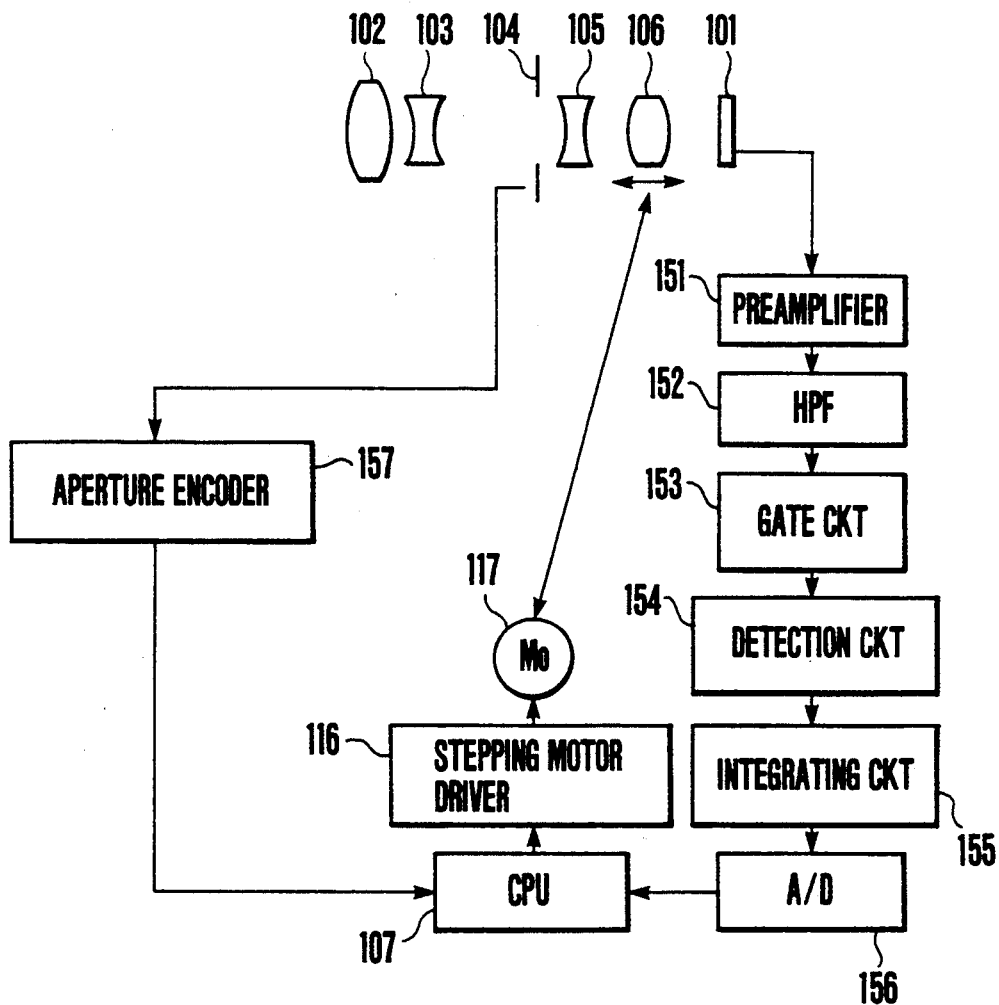
FIG. 9 is a block diagram showing an AF device.
Figure 10:
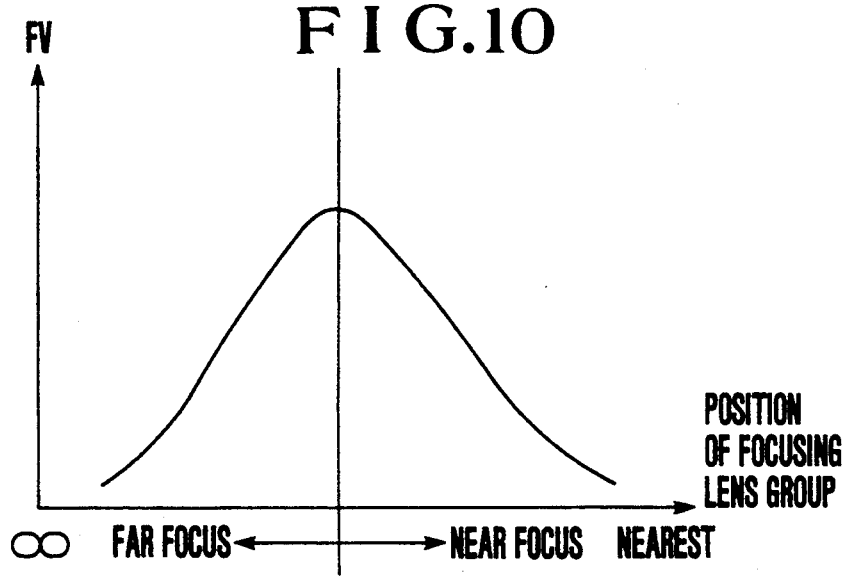
FIG. 10 is a graph showing the principle of the AF device.
Figure 11:
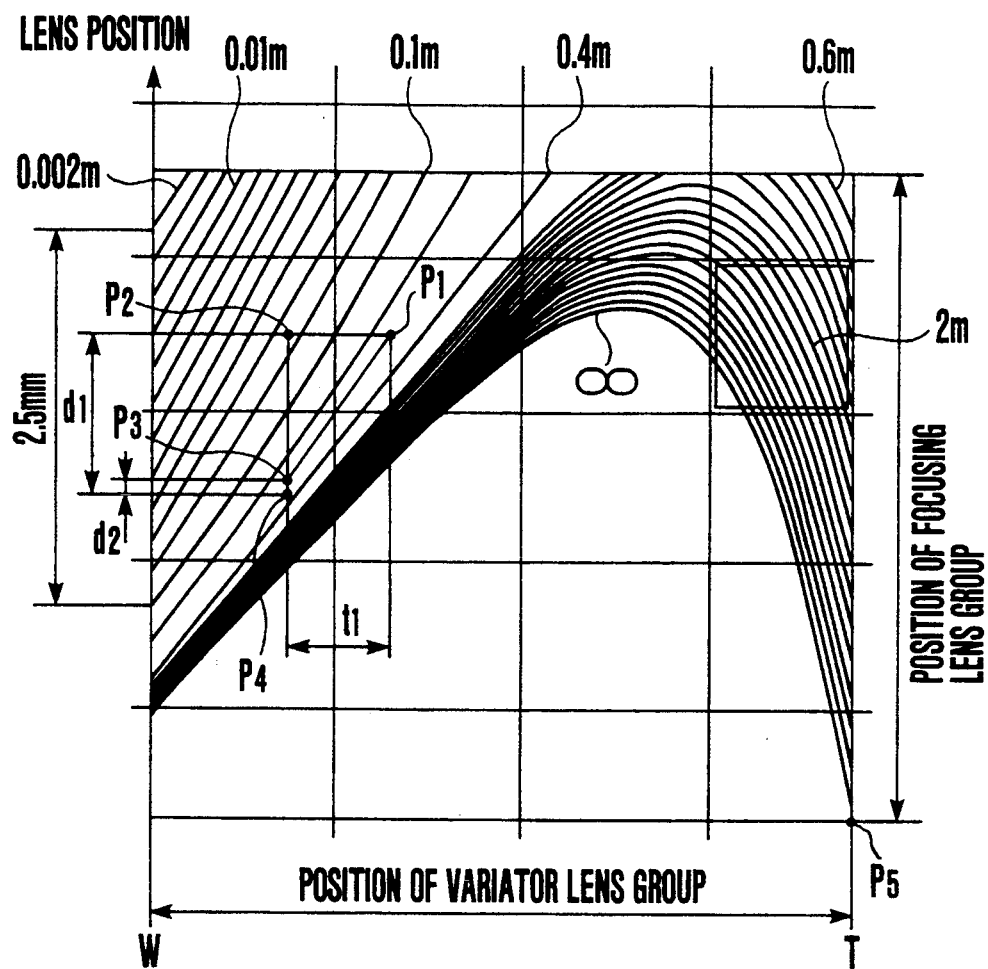
FIG. 11 is a graph showing a positional relation between the lenses of the video camera.
Figure 12:
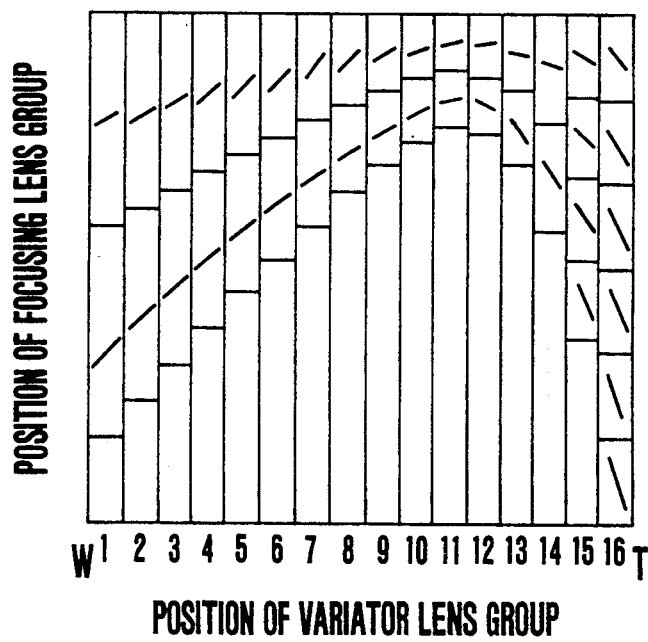
FIG. 12 shows by way of example the division of a cam locus during zooming.
Figures 13A, 13B, 13C:
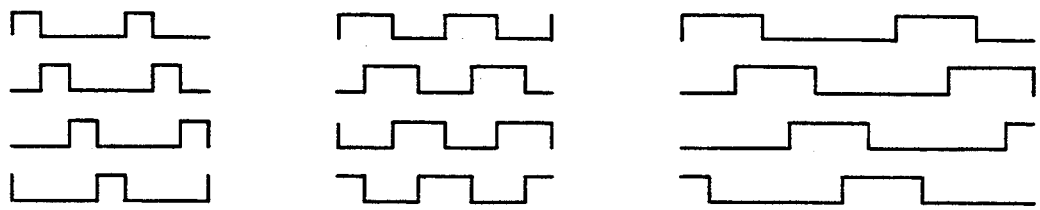
FIG. 13 shows exciting methods generally used for a two-phase stepping motor.
Figure 13D:
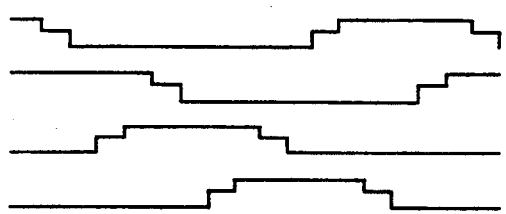
Figure 14:
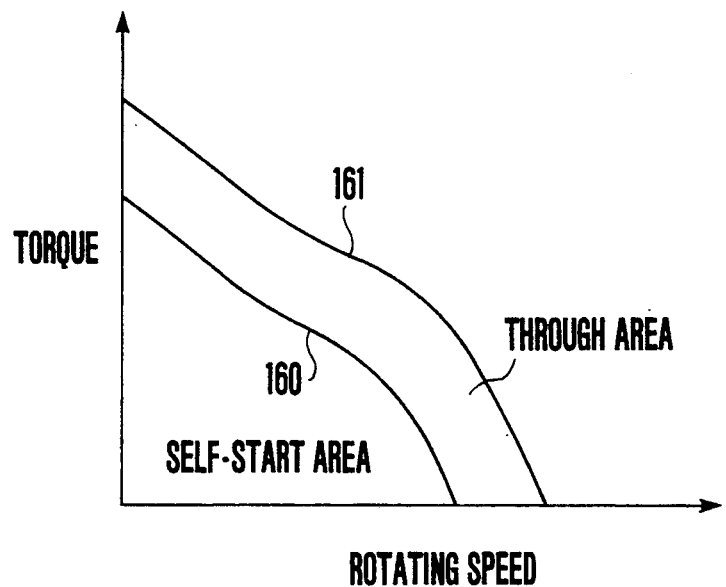
FIG. 14 shows the generic characteristic of the stepping motor.

A first embodiment of the invention is described with reference to FIGS. 1, 2 and 3 as follows: In the following description of embodiments, component parts indicated by the same reference numerals as those shown in FIG. 8 have the same functions.

Figure 1:
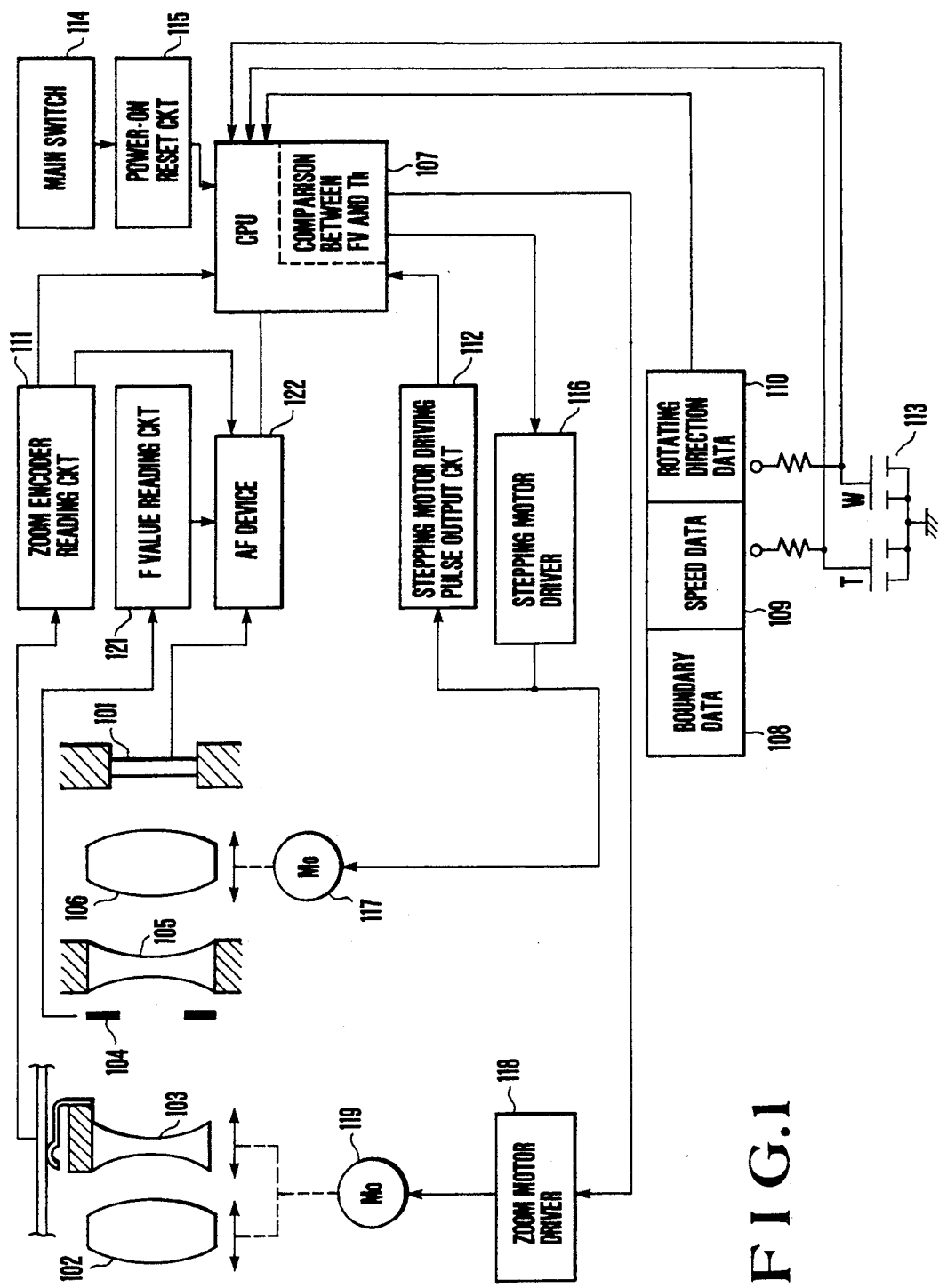
FIG. 1 is a block diagram showing in outline the lens driving device of a first embodiment of this invention.

In the case of the first embodiment shown in FIG. 1, this invention is applied to a zoom lens of the type having a first lens group and a second lens group arranged to be moved in an interlocking manner by a power varying operation. The arrangement of the first embodiment shown in FIG. 1 is of an amplitude modulation type wherein a focusing lens group 106 is arranged to be moved in the direction of an optical axis by means of a stepping motor 117 which is employed as a focusing motor.

Figure 2:
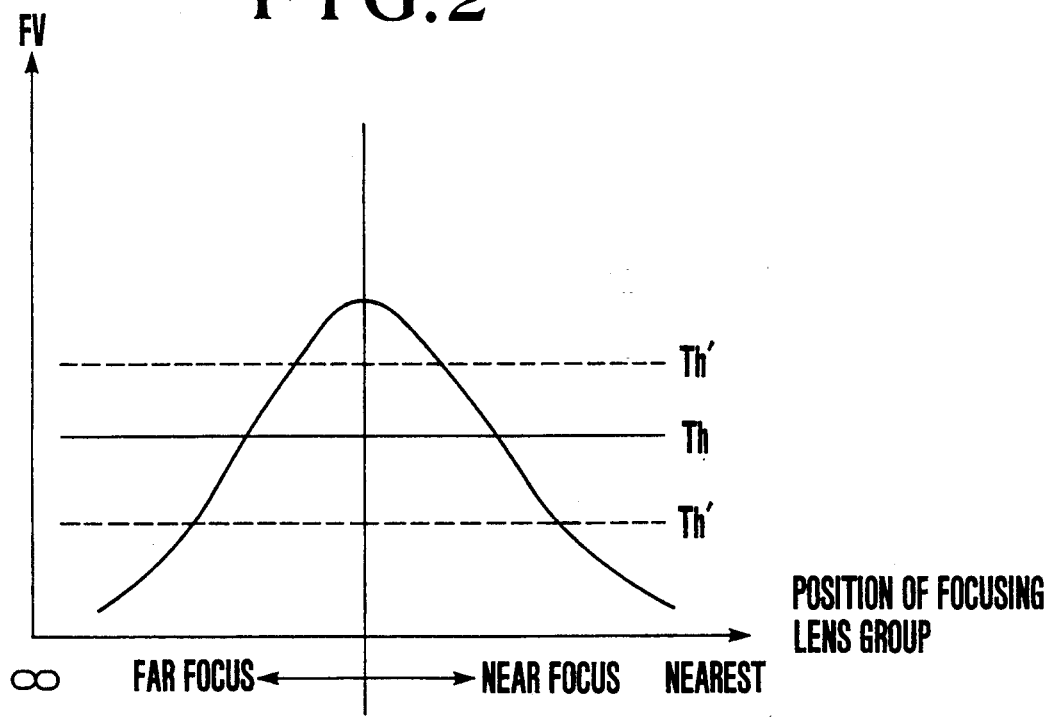
FIG. 2 is a graph showing the principle and operation of an automatic focusing device.
Figure 3:
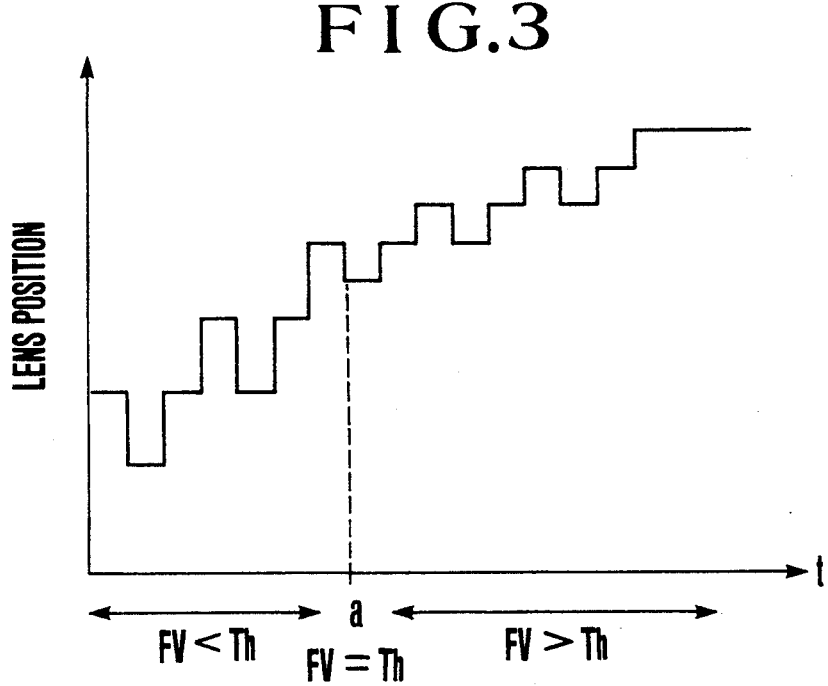
FIG. 3 is a graph showing the state of changing the lens position by driving a motor in the first embodiment.

In FIG. 2, the positions of the focusing lens group 106 are shown on the abscissa and the values FV of a high-frequency component on the ordinate axis. The value FV obtained when the focusing lens group 106 is moved for a stationary object from an infinity-distance in-focus position to a nearest-distance in-focus position presents a hill-shaped characteristic curve as shown in FIG. 2. A position of the focusing lens group 106 where the value FV reaches a peak thereof is an in-focus position. Further, the value FV is usable not only for finding the value of one spatial frequency but also for some other control purpose. Therefore, it is possible to use a value obtained by normalizing the value FV in a suitable manner.

Further, in the case of this embodiment, the degree of blur is graded by comparing the value FV with a threshold value Th. The threshold value Th is stored in the CPU 107. The value FV supplied from the AF device 122 to the CPU 107 is compared with the threshold value Th. If the value FV is larger than the threshold value Th, the lens position can be considered to be near to an in-focus point. Therefore, a modulating amplitude must be set within the diameter of such a circle of confusion that is caused by the lens amplitude but shows no blurred state perceptible by eye. In other words, it must be set within an allowable diameter of the circle of confusion.

This embodiment is arranged to read an aperture value (hereinafter referred to as an F value) by means of an F value reading circuit 121 and supplies it to the CPU 107. Within the CPU 107, the amplitude of an exciting voltage for the stepping motor 117 is determined on the basis of the F value. Then, a control signal is supplied from the CPU 107 to a stepping motor driver 116 to cause the stepping motor driver 116 to generate an output which brings about this exciting voltage. This causes the driver 116 to drive the stepping motor 117. To satisfy the above-stated condition, this embodiment employs either the one/two-phase excitation method or the MS excitation method which is suited for fine control in driving the stepping motor 117. Further, if the value FV is found to be less than the threshold value Th, the image formed can be regarded as in a blurred state. In this case, it is desirable to speedily escape the blurred state. For this purpose, this embodiment employs the two-phase excitation method which is suited for high speed driving as the exciting method for driving the stepping motor 117. Therefore, the blur escaping time can be shortened. FIG. 3 shows a manner in which the position of the focusing lens group 106 is shifted by slightly moving it. In FIG. 3, the ordinate axis shows the lens position and the abscissa axis the time. A part (1) in FIG. 3 shows the timing of a pulse sent out for every step of the motor. Further the state shown in FIG. 3 is obtained when the value FV becomes equal to the threshold value Th at a point of time "a".

Further, the embodiment may be arranged to increase the number of threshold values Th (i.e., to divide the in-focus state). Such arrangement permits finer position control in the neighborhood of an in-focus point in addition to shortening the blur escaping time.

The embodiment described is capable of driving the stepping motor in a manner more apposite to the focusing state and shortening the blur escaping time (a period of time required before obtaining an in-focus state).

Figure 4:
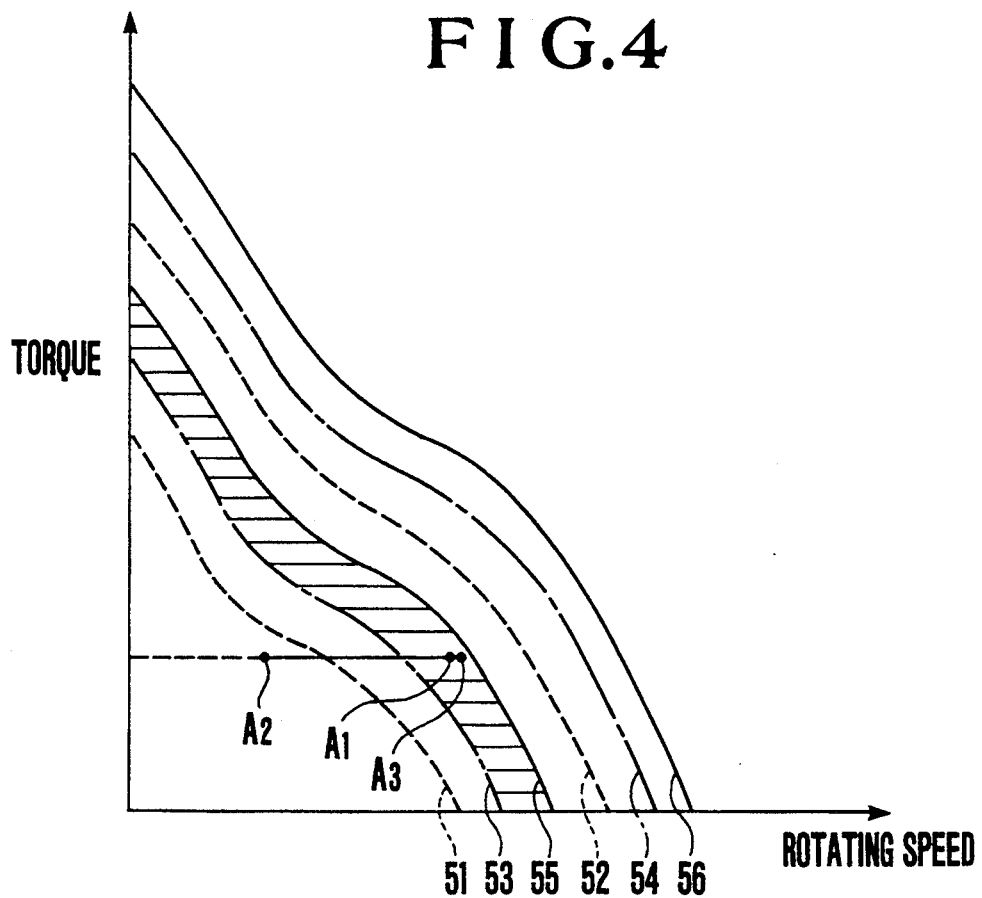
FIG. 4 is a graph showing a second embodiment of the invention through the characteristics of a stepping motor.
Figure 5:
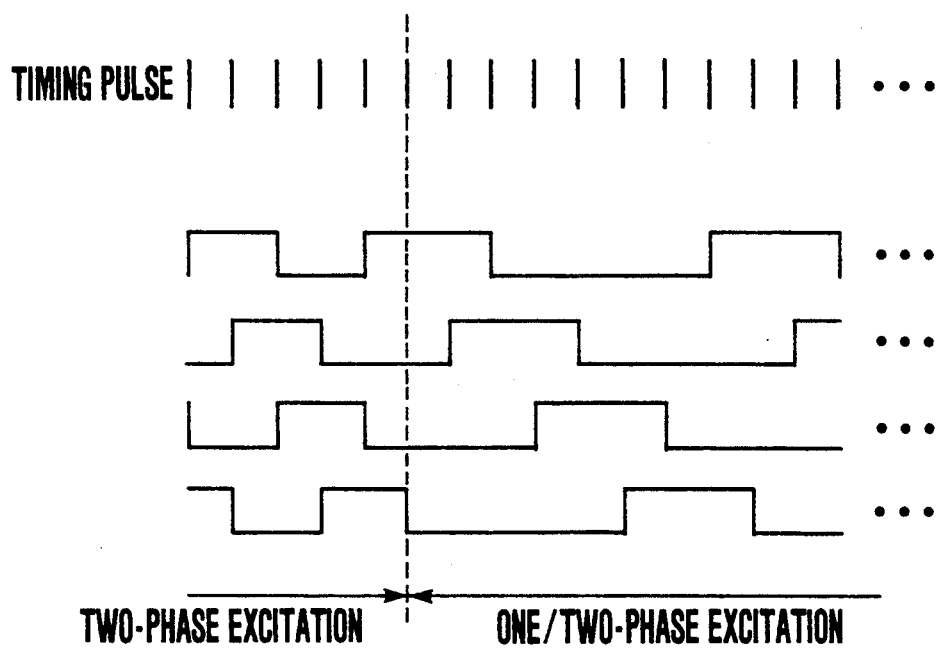
FIG. 5 shows an exciting method employed in the second embodiment.

Next, referring to FIGS. 4 and 5, the second embodiment of this invention is described as follows: the second embodiment is arranged to permit finer control and a high-speed driving action on the motor by using not only the two-phase excitation but also the through area of the one/two-phase excitation or the MS excitation. FIG. 4 shows characteristics obtained in general by these stepping motor exciting methods. Referring to FIG. 4, characteristic curves 51 and 52 show pull-in and pull-out torques obtained by the MS excitation. Characteristic curves 53 and 54 show the pull-in and pull-out torques obtained by the one/two-phase excitation respectively. Further, characteristic curves 55 and 56 show the pull-in and pull-out torques obtained by the two-phase excitation. In a case where the stepping motor is used, for example, at a point A1 within the through area of the one/two-phase excitation between the characteristic curves 53 and 54, the rotating speed of the motor must be slowly increased from a point A2 shown within the self-start area defined by the characteristic curve 53. It is, therefore, difficult to perform control in the above-stated manner. In view of this, the second embodiment is arranged to start the stepping motor at the rotating speed of a point A3 at which a self-start is possible by the two-phase excitation. Then, after the stepping motor is driven either by several pulses or for a period of several seconds defined by using a timer, the motor is driven by changing the two-phase excitation over to the one/two-phase excitation or the MS excitation. FIG. 5 is a time chart showing the exciting sequence of the second embodiment. With the exciting sequence stored in the CPU 107 as shown in FIG. 5, it is relatively easy to carry out fine control and high speed driving.

Figure 6:
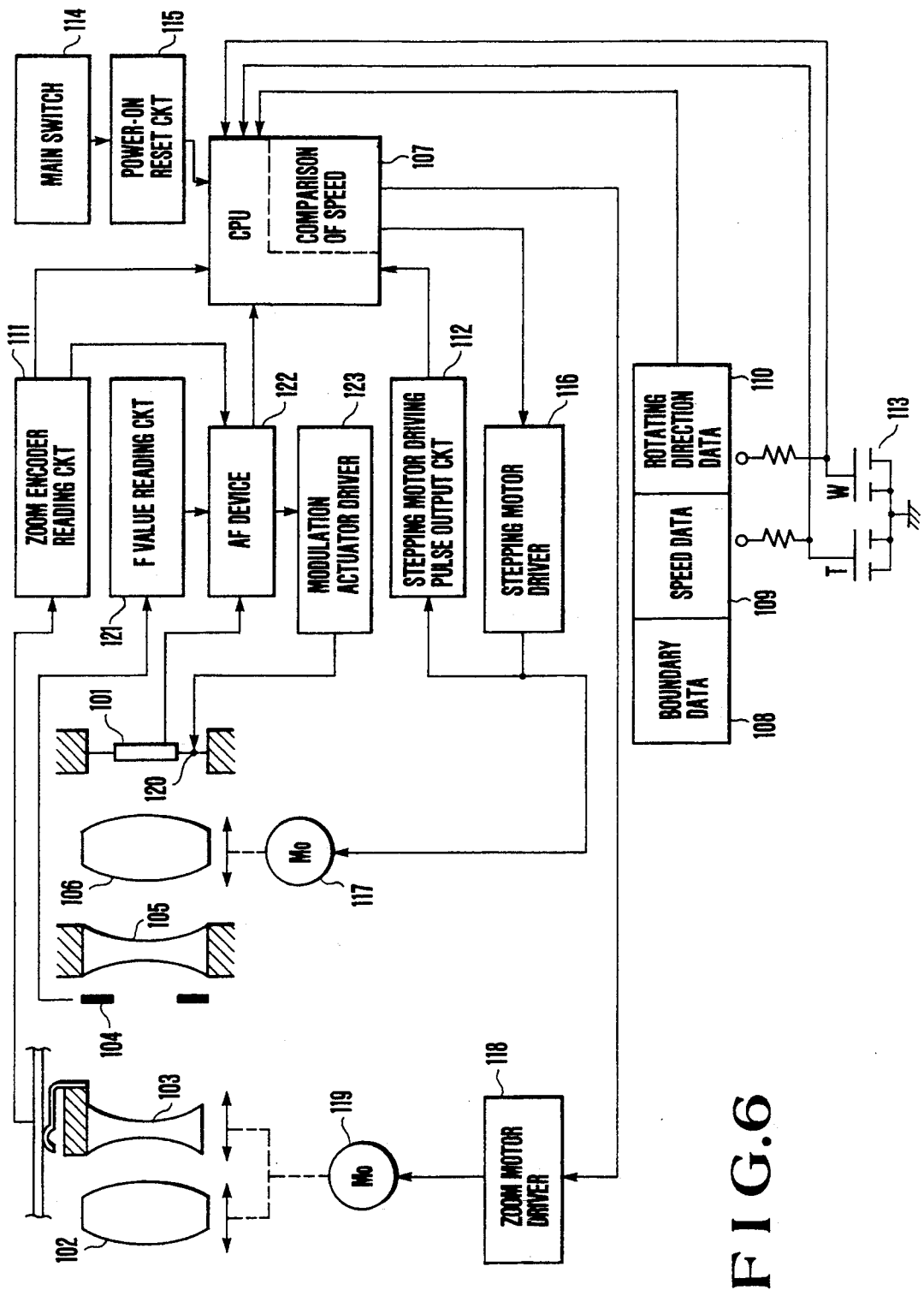
FIG. 6 is a block diagram showing in outline the arrangement of a third embodiment of the invention.

Referring to FIG. 6, a third embodiment of this invention is described as follows: The third embodiment is arranged to use the high-speed driving method of the second embodiment only in a case where a sufficient speed is hardly obtainable during zooming solely by the stepping motor rotating speed which is obtainable within the self-start area of the MS excitation and that of the one/two-phase excitation.

Further, in the case of the third embodiment shown in FIG. 6, the invention is applied to a lens driving device for a zoom lens of the rear focus type. However, the invention is applicable also to a front focus type zoom lens. Further, the modulation method for AF is of the type modulating the amplitude of the CCD (an image sensor) in the optical axis direction by means of a modulation actuator. However, this method may be replaced with a type modulating the amplitude of the focusing lens group by means of a stepping motor.

The CPU 107 is arranged to receive speed data Dv which is stored for every area determined during zooming by both the result of detection made by the zoom encoder reading circuit 111 and the output of the stepping motor drive pulse output circuit 112. A maximum self-start speed Dvmax which is obtainable by the one/two-phase excitation and the MS excitation is stored beforehand in the CPU 107. The above-stated data Dv is compared with the maximum speed Dvmax by comparison means arranged within the CPU 107. If the maximum speed Dvmax is larger than the data Dv, the data Dv indicates a speed at which a self-start is possible by the one/two-phase excitation and the MS excitation. In that case, therefore, the one/two-phase excitation and the MS excitation are employed from the start. If the speed data Dv is found to be larger than the maximum speed Dvmax, the stepping motor is excited in the same manner as in the case of the second embodiment, that is at the time of start, the two-phase excitation is used for a period of several pulses. After that, the exciting method is changed to the one/two-phase excitation and the MS excitation and the stepping motor are then excited in the through area of the one/two-phase excitation and the MS excitation.

The above-stated arrangement enables the third embodiment to finely control and drive the stepping motor at a high speed like in the case of the second embodiment.

Figure 7:
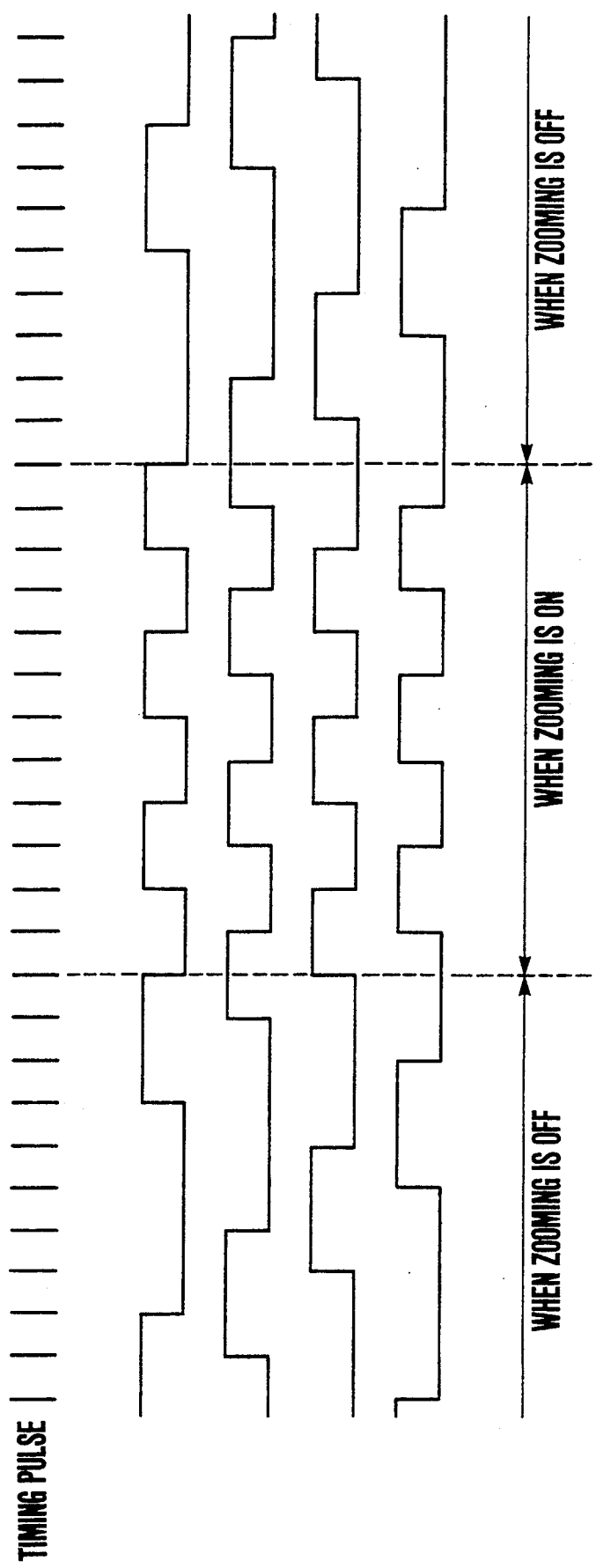
FIG. 7 shows an exciting method employed in a fourth embodiment of the invention.

A fourth embodiment of this invention is described as the angle of view comes to vary during the process of zooming. Therefore, a blurred state is inconspicuous during zooming. In other words, somewhat more coarse position control is allowable during the process of zooming than during normal AF. By taking advantage of this, the fourth embodiment is arranged to use the two-phase excitation which permits high speed driving as the exciting method for driving the stepping motor if a zoom operation switch 113 is in an on-state. If the zoom operation switch 113 is in an off-state, the fourth embodiment uses the one/two-phase excitation and the MS excitation which permit fine control. FIG. 7 is a time chart showing by way of example the exciting method employed by the fourth embodiment.

The above-stated arrangement enables the fourth embodiment to obtain a high rotation speed required during zooming without increasing the size of the stepping motor.

The embodiment described has the following advantages by virtue of the arrangement to switch the exciting method used for driving the stepping motor from one method over to another on the basis of at least one of the conditions including the state of focus, information on the lens moving control performed in zooming and information on the zooming operation:

(i) fine control can be accomplished in the neighborhood of an in-focus point and a length of time required in escaping a blurred state can be shortened;
(ii) control for the use of the stepping motor in the through area can be simply accomplished;
(iii) control can be finely performed for AF and, in the event of zooming, the stepping motor can be driven at a rotation speed required for zooming.

The problems relative to the performance of the motor of a video camera or the like can be solved without increasing the size of the motor.

What is claimed is:
1. An optical apparatus having a lens driving device, comprising:
 (a) a first lens which performs a power varying action by moving in the direction of an optical axis;
 (b) a second lens which performs, by moving in the direction of the optical axis, both a focusing action and a compensating action required as a result of the movement of said first lens;
 (c) a first motor for moving said first lens
 (d) a second motor for moving said second lens, said second motor being a stepping motor;
 (e) an operation switch for performing said power varying action; and
 (f) control means for providing driving excitation for driving said first and second motors, said control means being arranged to selectively perform change-over control over a plurality of respectively different driving excitations for driving said second motor, in accordance with an operation state of said operation switch.
2. An apparatus according to claim 1, wherein said control means changes over from a first driving excitation which permits a high-speed drive to a second driving excitation.
3. An apparatus according to claim 2, wherein said first driving excitation is one/two-phase excitation and said second driving excitation is two-phase excitation.
4. An optical apparatus having a lens driving device, comprising:
 (a) a first lens which performs a power varying action by moving in the direction of an optical axis;
 (b) a second lens which performs, by moving in the direction of the optical axis, both a focusing action and a compensating action required as a result of the movement of said first lens;
 (c) a first motor for moving said first lens;
 (d) a second motor for moving said second lens, said second motor being a stepping motor;
 (e) position detecting means for detecting positions of said first and second lenses; and
 (f) control means for providing driving excitation for driving said first and second motors, said control means being arranged to selectively perform change-over control over a plurality of respectively different driving excitations for driving said second motor, in accordance with the positions of said first and second lenses.
5. An apparatus according to claim 4, wherein said control means changes over to at least one/two-phase excitation and two-phase excitation.

* * * * *

UNITED STATES PATENT AND TRADEMARK OFFICE
CERTIFICATE OF CORRECTION

PATENT NO. : 5,446,517
DATED : August 29, 1995
INVENTOR(S) : Junichi Murakami et al.

It is certified that error appears in the above-indentified patent and that said Letters Patent is hereby corrected as shown below:

Cover Page, Item [54]. Change "CAMERA" to -- OPTICAL APPARATUS --.

Col. 1, line 2. Change "CAMERA" to -- OPTICAL APPARATUS --.

Col. 4, line 11. Change "(IV) and" to -- and (IV) --.

Col. 7, line 52. After "accomplished;" insert -- and --.

Signed and Sealed this

Twenty-sixth Day of December, 1995

Attest:

BRUCE LEHMAN

Attesting Officer     Commissioner of Patents and Trademarks